United States Patent
Huang et al.

(10) Patent No.: US 9,066,256 B2
(45) Date of Patent: Jun. 23, 2015

(54) METHOD, DEVICE AND SYSTEM FOR OFFLOADING NETWORK TRAFFIC

(75) Inventors: Fuqing Huang, Milan (IT); Jian Li, Beijing (CN); Ting Zou, Santa Clara, CA (US); Peng Yang, Shenzhen (CN); Yu Zhang, Beijing (CN); Yuxiang Wang, Hampshire (GB); Minchang Yang, Shenzhen (CN); Zhiwang Zhao, Beijing (CN); Huangcheng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 13/428,989

(22) Filed: Mar. 23, 2012

(65) Prior Publication Data

US 2012/0176994 A1 Jul. 12, 2012

Related U.S. Application Data

(63) Continuation of application No. PCT/CN2009/074201, filed on Sep. 24, 2009.

(51) Int. Cl.
*H04W 4/00* (2009.01)
*H04J 3/24* (2006.01)
(Continued)

(52) U.S. Cl.
CPC ........... *H04W 28/08* (2013.01); *G06F 11/0781* (2013.01); *H04L 47/122* (2013.01); *H04L 47/14* (2013.01); *H04L 47/2441* (2013.01); *H04L 47/808* (2013.01)

(58) Field of Classification Search
CPC ............................ H04L 47/122; H04L 47/14
USPC ............ 370/237, 390, 329, 338, 349, 395.32, 370/395.52; 455/435, 422; 709/231
See application file for complete search history.

(56) References Cited

U.S. PATENT DOCUMENTS 7,020,090 B2 * 3/2006 Chandwadkar et al. ...... 370/249
7,027,818 B2 * 4/2006 Bos et al. .................... 455/452.2
(Continued)

FOREIGN PATENT DOCUMENTS

CN 1446011 A 10/2003
CN 1666440 A 9/2005
(Continued)

OTHER PUBLICATIONS

Written Opinion of the International Searching Authority dated Jun. 17, 2010 in connection with International Patent Application No. PCT/CN2009/074201.

(Continued)

*Primary Examiner* — Alpus H Hsu
*Assistant Examiner* — Camquyen Thai (57) ABSTRACT

A method, a device, and a system for offloading network traffic are provided, which are applied in the field of mobile communications. An offloading device located before a Serving General Packet Radio Service Support Node (SGSN) receives a data stream of a user sent by a base station, obtains an offloading policy of the user from the offloading device and/or obtains the offloading policy of the user from a policy server, and forwards the data stream according to the offloading policy. Accordingly, the offloading device can obtain the corresponding offloading policy according to the data stream sent by a forwarding plane, send a data stream of low value, low real-time performance requirement, or low priority to the Internet or another specific networks, and send a data stream of high value, high real-time performance requirement, or high priority to high-value devices, thereby reducing the networking cost.

5 Claims, 7 Drawing Sheets

(51) Int. Cl.
*H04L 12/28* (2006.01)
*H04W 28/08* (2009.01)
*H04L 12/803* (2013.01)
*H04L 12/801* (2013.01)
*H04L 12/851* (2013.01)
*H04L 12/927* (2013.01)
*G06F 11/07* (2006.01)

(56) References Cited

U.S. PATENT DOCUMENTS

| | | | |
|---|---|---|---|
| 8,179,903 B2 * | 5/2012 | Gupta et al. | 370/400 |
| 8,374,605 B2 * | 2/2013 | Kuhn et al. | 455/435.3 |
| 8,488,559 B2 * | 7/2013 | Turanyi | 370/331 |
| 2003/0009580 A1 * | 1/2003 | Chen et al. | 709/231 |
| 2008/0005285 A1 * | 1/2008 | Robinson et al. | 709/220 |
| 2010/0027542 A1 * | 2/2010 | Huang et al. | 370/390 |
| 2010/0260099 A1 * | 10/2010 | Frost et al. | 370/328 |
| 2011/0058479 A1 * | 3/2011 | Chowdhury | 370/237 |

FOREIGN PATENT DOCUMENTS

| | | |
|---|---|---|
| CN | 1848798 A | 10/2006 |
| CN | 101052037 A | 10/2007 |
| CN | 101075886 A | 11/2007 |
| EP | 1 916 803 A1 | 4/2008 |
| EP | 2 293 643 A1 | 3/2011 |

OTHER PUBLICATIONS

Extended European Search Report of the European Patent Office dated Jul. 19, 2012 in connection with European Patent Application No. 09849661.5, 5 pages.

Translation of Office Action Office dated Sep. 29, 2012 in connection with Chinese Patent Application No. 200980150011.5.

International Search Report dated Jun. 17, 2010 in connection with International Patent Application No. PCT/CN2009/074201.

* cited by examiner

METHOD, DEVICE AND SYSTEM FOR OFFLOADING NETWORK TRAFFIC

CROSS-REFERENCE TO RELATED APPLICATIONS

This application is a continuation of International Application No. PCT/CN2009/074201, filed on Sep. 24, 2009, which is hereby incorporated by reference in its entirety.

TECHNICAL FIELD

The present invention relates to the field of mobile communications technologies, and in particular, to a method, a device and a system for offloading network traffic in mobile communication.

BACKGROUND

Figure 1:
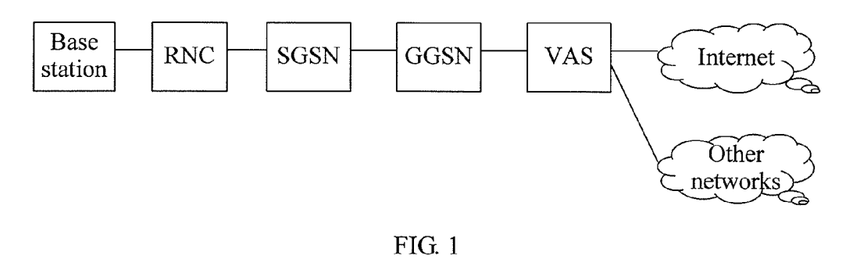
FIG. 1 is a typical networking diagram of a mobile network in the prior art.

A typical networking of a mobile network in the prior art is as shown in FIG. 1, and includes a base station, a radio network controller (Radio Network Controller, RNC), a serving general packet radio service (General Packet Radio Service, GPRS) support node (Serving GPRS Support Node, SGSN), a gateway general packet radio service GPRS support node (Gateway GPRS Support Node, GGSN), a value-added server (Value-Added Server, VAS), Internet, and other networks. The base station is configured to receive and send radio signals bidirectionally. The RNC is a component of an access network, and is configured to provide mobility management, call processing, link management, and a switching mechanism. The SGSN provides a connection to the radio network controller RNC to perform mobile data management, such as identification, encryption, and compression; and through a connection to the GGSN, provides a transmission channel between an IP packet and a radio unit, and functions such as protocol conversion. The GGSN mainly serves as a gateway, which may be connected to multiple different types of data networks to convert the protocol of GPRS packets in a GSM network so that the packets are transferred to a remote network. The VAS is configured to provide an interface between a value-added service (such as, a multimedia service) and the GGSN. In such a networking scenario, data streams of a user pass through devices such as the SGSN, the GGSN, and the VAS without discriminating the service properties. For example, all uplink data streams of the user from a user equipment pass through the base station, the RNC, the SGSN, the GGSN, and the VAS sequentially, and finally, arrive a destination. All downlink data streams of the user from a data source passes through the VAS, the GGSN, the SGSN, the RNC, and the base station sequentially, and finally arrive the user equipment. All uplink or downlink traffic of the user consumes the processing capability of the devices such as SGSN, GGSN, and VAS, and the capacity of links between the devices.

In the research process, the inventor finds that sharp increase of the broadband data traffic of a mobile network imposes higher requirements on the bandwidth. An operator needs to deploy more expensive devices such as SGSN, GGSN, and VAS as well as costly links between such devices, which increases the network expansion cost greatly. Therefore, it is necessary to provide a cost-efficient mobile service solution.

SUMMARY

Embodiments of the present invention provide a method, a device, and a system for offloading network traffic in mobile communication, so as to reduce the bandwidth load of SGSN and GGSN and reduce the networking cost.

A method for offloading network traffic provided according to one aspect of the present invention is applied in mobile communication, and includes: receiving, by an offloading device located before a serving general packet radio service support node SGSN in an uplink direction of a user, a data stream of the user sent by a base station, obtaining an offloading policy of the user from the offloading device and/or obtaining the offloading policy of the user from a policy server, and forwarding the data stream according to the offloading policy, where the forwarding the data stream according to the offloading policy includes determining whether to forward the data stream to the SGSN or to forward the data stream to internet or other specific network according to the offloading policy.

An offloading device provided according to a second aspect of the present invention is set in a mobile communication network. The offloading device is located before a serving general packet radio service support node SGSN in an uplink direction of a user, and includes: a receiving module, configured to receive a data stream of the user through a base station; an obtaining module, configured to obtain an offloading policy of the user from the offloading device and/or obtaining the offloading policy of the user from a policy server; and an offloading module, configured to forward the data stream received by the receiving module according to the offloading policy obtained by the obtaining module, where the offloading module is specifically configured to determine whether to forward the data stream to the SGSN or to forward the data stream to Internet or other specific network according to the offloading policy.

A system for offloading network traffic provided according to a third aspect of the present invention is applied in mobile communication, the system includes a base station and an offloading device. The base station is configured to send a data stream of a user to the offloading device; and the offloading device is located before a serving general packet radio service support node SGSN in an uplink direction of the user, and is configured to receive the data stream of the user sent by the base station, obtain an offloading policy of the user from the offloading device and/or obtaining the offloading policy of the user from a policy server, and forward the data stream according to the offloading policy, where the forward the data stream according to the offloading policy comprises determine whether to forward the data stream to the SGSN or to forward the data stream to Internet or other specific network according to the offloading policy.

Through the embodiments of the present invention, the offloading device can obtain the corresponding offloading policy according to the data stream sent by a forwarding plane, and forward the data stream according to the offloading policy, so as to avoid sending of all data streams to devices such as SGSN, thereby reducing the networking cost.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

Figure 2:
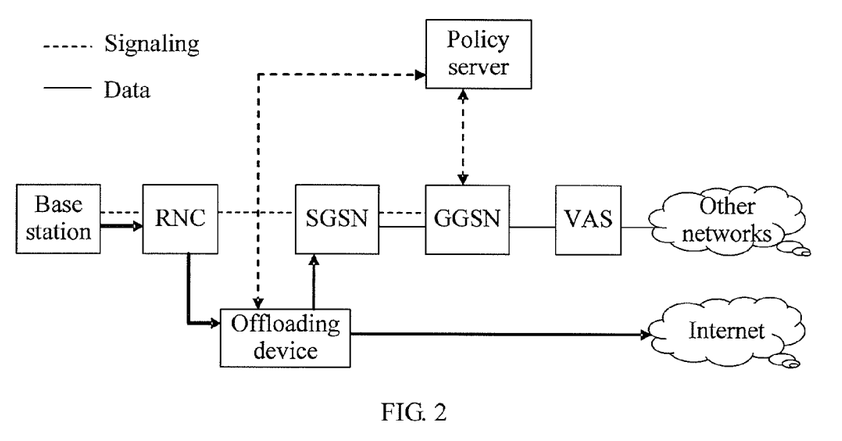
FIG. 2 is a schematic structural diagram of a system for offloading network traffic in an embodiment of the present invention.

An embodiment of the present invention provides a system for offloading network traffic. As shown in FIG. 2, the system includes a base station, a radio network controller RNC, a serving GPRS support node SGSN, a gateway GPRS support node GGSN, a value-added server VAS, Internet, and other networks. However, in part embodiments of the present invention, the functions of the SGSN and/or the GGSN may need to be extended, and the specific extension may be embodied in the following descriptions for methods. Moreover, the system further includes an offloading device and a policy server. The policy server may be a policy and charging rules function (Policy and Charging Rules Function, PCRF) or other devices that can provide charging and offloading policies. When the system for offloading network traffic is used to transmit data, a charging policy of a user needs to be established or obtained through a signaling plane (indicated by dotted lines in FIG. 2) first, and then the data of the user transmitted on a data plane (indicated by solid lines in FIG. 2) is off loaded or charged according to the charging policy. The offloading device is located before the SGSN in an uplink direction of the user, and is configured to offload a data stream of the user according to an offloading policy configured/generated by the offloading device or an offloading policy obtained from the policy server.

Figure 3:
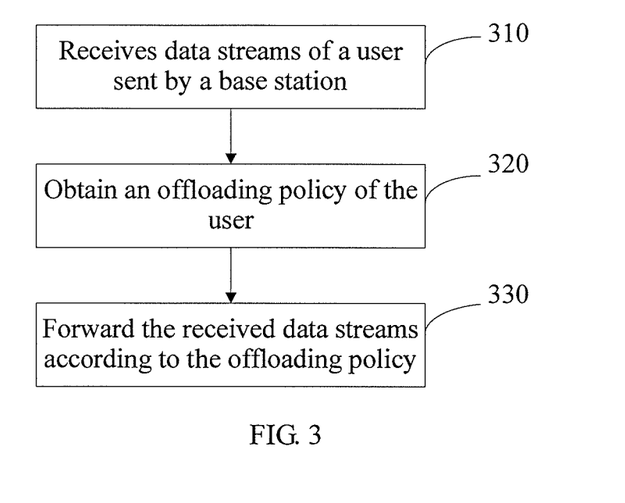
FIG. 3 is a schematic flow chart of a method for offloading network traffic in an embodiment of the present invention.

The devices in the system for offloading network traffic shown in FIG. 2 may work together, so as to meet different service requirements of the user through offloading, and reduce the networking cost of an operator. An embodiment of a method for offloading network traffic implemented with the system shown in FIG. 2 is as shown in FIG. 3. The method includes the following steps.

Step 310: An offloading device receives a data stream of a user sent by a base station.

In the embodiment of the present invention, all the data streams of the user are sent through the base station. The offloading device is located before an SGSN in an uplink direction of the user.

Step 320: The offloading device obtains an offloading policy of the user.

The offloading device obtains the offloading policy of the user in any one or multiple of the following manners (A, B, C).

A) The offloading device sends a policy request message to a policy server, in which the policy request message carries a user IP address obtained through parsing, by the offloading device, a data packet in the data stream. The policy request message is used to request an offloading policy for the user from the policy server. The policy server finds user information according to the user IP address, generates an offloading policy according to the user information, and sends the generated offloading policy to the offloading device.

B) The offloading device sends user information request message to a policy server, in which the user information request message carries a user IP address obtained through parsing, by the offloading device, a data packet in the data stream. The policy server searches for user information according to the user information request message, and sends the found user information to the offloading device. The offloading device generates an offloading policy according to the received user information.

(C) The offloading device obtains an offloading policy pre-configured by the offloading device. The same APN is set for all users requiring offloading to a network; one or multiple uplink GTP-U tunnel destination addresses are allocated, on the SGSN, to the APN (when multiple uplink GTP-U tunnel destination addresses are allocated, the multiple uplink GTP-U tunnel destination addresses may form an IP address segment); and an offloading table is formed according to a mapping relation between the APN and the uplink GTP-U tunnel destination address. An offloading table having the same content as that on the SGSN is also configured on the offloading device as an offloading policy.

Step 330: The offloading device forwards the received data stream according to the offloading policy.

The offloading policy may be used to distinguish whether a data stream to which a data packet belongs is a high-value data stream or a low-value data stream. The high-value data stream and the low-value data stream may be determined by an operator (a mobile service provider) according to the charge of the data stream. When determining that the data packet belongs to a high-value data stream, the offloading device sends the data stream to the SGSN, and then to a service processing server such as VAS through the SGSN. When determining that the data stream belongs to a low-value data stream, the offloading device sends the data stream to the Internet or a specific network such as IP/MPLS network.

The offloading policy may also be determined based on the real-time performance or priority of a service to which a data stream belongs. For example, when the real-time performance or priority of the service is low, the offloading device sends the data stream to the Internet or other specific networks; when the real-time performance or priority of the service is high, the offloading device sends the data stream to the SGSN, and then to a service processing server such as VAS through the SGSN.

Figure 4:
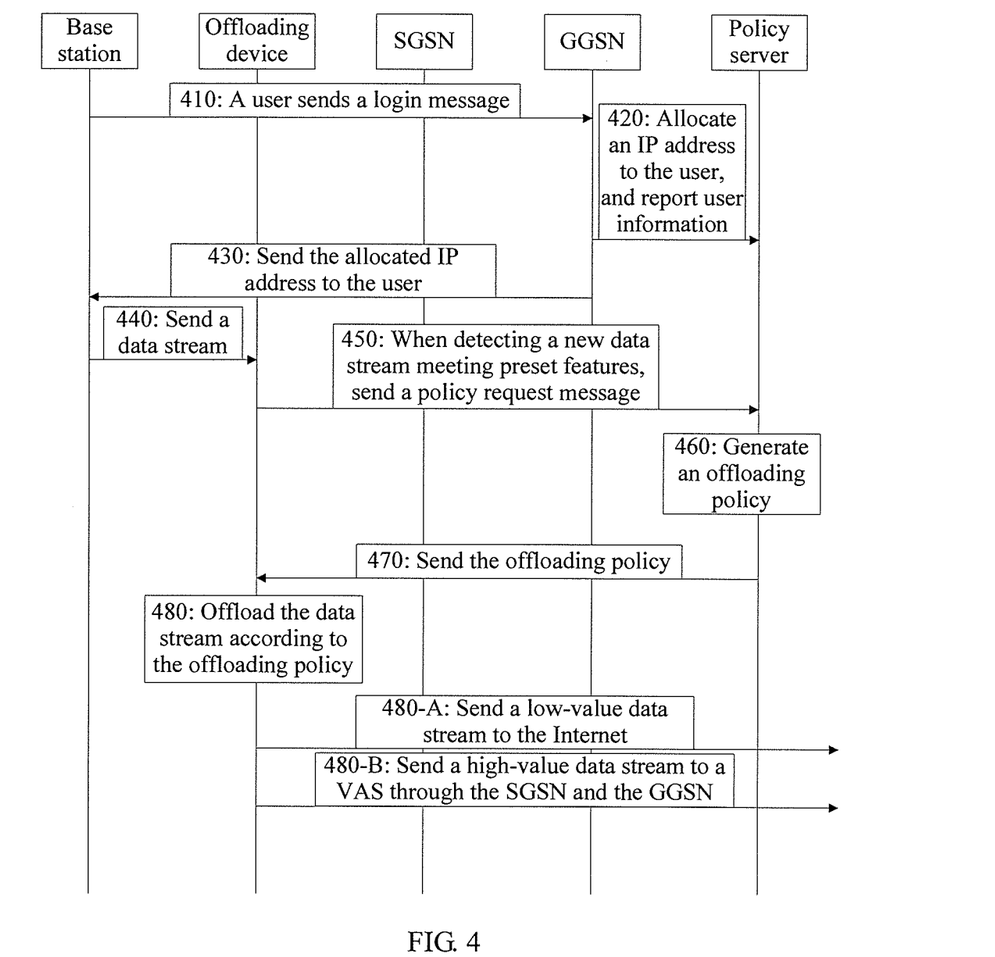
FIG. 4 is a signaling flow chart of another method for off loading network traffic in an embodiment of the present invention.

In another embodiment of the present invention, a connection between a user and a mobile network is established first, and then a data packet sent by the user is forwarded. FIG. 4 is a signaling flow chart of a method for offloading network traffic implemented in another embodiment of the present invention. The method includes the following steps.

Step 410: A user sends a login message to a GGSN through a base station to request establishment of a connection, where the login message carries at least an access point name APN of the user.

Step 420: After receiving the login message, the GGSN sends a report message to a policy server to report user information of the user.

After receiving the login message, the GGSN first allocates an IP address to the user, and then sends a report message to a policy server to report related information of the user. The report message carries user information such as the access point name (Access Point Name, APN) (used to identify an access manner of a service to a network) of the user, the IP address allocated to the user, an international mobile subscriber identity (International Mobile Subscriber Identity, IMSI) (number allocated to uniquely identify a mobile subscriber internationally) of the user, a mobile station Integrated Services Digital Networks number (mobile station ISDN number) (a number, which can uniquely identify a mobile subscriber in the numbering plan for the Public Switched Telephone Network), and a charging identifier.

Step 430: The GGSN sends the IP address to the user through the base station, where the IP address is allocated to the user.

Step 440: After receiving the allocated IP address, the user sends a data stream through the base station.

The processes of the allocating, by the GGSN, the IP address to the user and the reporting the user information in steps 410-440 may be carried out in other manners well-known to those skilled in the art. For example, the user carries an IP address in the login message, and the GGSN determines whether the IP address carried in the login message can be used.

Step 450: The offloading device detects the received data stream. When finding that a data packet of the data stream has preset features (for example, the traffic engineering identity (Traffic Engineering Identity, TE ID) carried in the packet is a newly detected TE ID, or the IP address is a new IP address, or an outer address is a specific uplink GTP-U tunnel destination address), the offloading device sends a policy request message to the policy server to request an offloading policy for data stream of the user.

An offloading server also needs to parse out the IP address of the user from the data packet of the data stream, carry the IP address into the policy request message, and send the policy request message to the policy server.

Step 460: After receiving the policy request message from the offloading device, the policy server generates an offloading policy for the data stream of the user.

After receiving the policy request message, the policy server searches for stored user information according to the user IP address in the policy request message, where the user information includes the related information reported by the GGSN, and subscription information, and then generates an offloading policy for the data stream of the user according to the user information and/or policy rules of the policy server.

Step 470: The policy server sends the generated off loading policy to the offloading device.

Specifically, the offloading policy may include one or multiple of the following information: for example, the IP address of the user, offloading or not, network node to which the traffic is offloaded, IMSI/MSISDN of the user, and the charging identifier.

Step 480: The offloading device offloads the new data stream according to the received offloading policy.

Offloading may be specifically as follows.

Step 480-A: Send a low-value data stream to the Internet or a specific network such as IP/MPLS network; and/or Step 480-B: Send a high-value data stream to a VAS or other service processing servers of specific functions through an SGSN and the GGSN.

In the embodiment, the offloading policy may be generated by the offloading device. In this case, steps 450-470 may be replaced by sending, by the off loading device, a user information request message to the policy server, where the user information request message carries the user IP address obtained through parsing; searing for, by the policy serve, user information according to the user information request message, and sends the found user information to the offloading device; and generating, by the offloading device, an offloading policy according to the received user information.

In the embodiment of the present invention, a step of charging the user may be further included. The GGSN and the offloading device generate a charging packet respectively for the data stream offloaded to the GGSN, and the data stream offloaded to the Internet or other specific networks, and report the charging packet to an accounting server (such as an Authentication Authorization Accounting AAA server or a CG server). The AAA server performs, according to the charging identifier, combined charging on the charging packets respectively reported by the GGSN and the offloading device.

In the embodiment of the present invention, the value of the data stream may be set and changed by an operator (a service provider) according to a policy of the operator.

In the embodiment of the present invention, the offloading device obtains the offloading policy generated according to the user information, and offloads the data stream of the user according to the offloading policy, so as to avoid the problem of excessively high networking cost caused by that the data streams all pass through the devices such as SGSN, GGSN and VAS.

Figure 5:
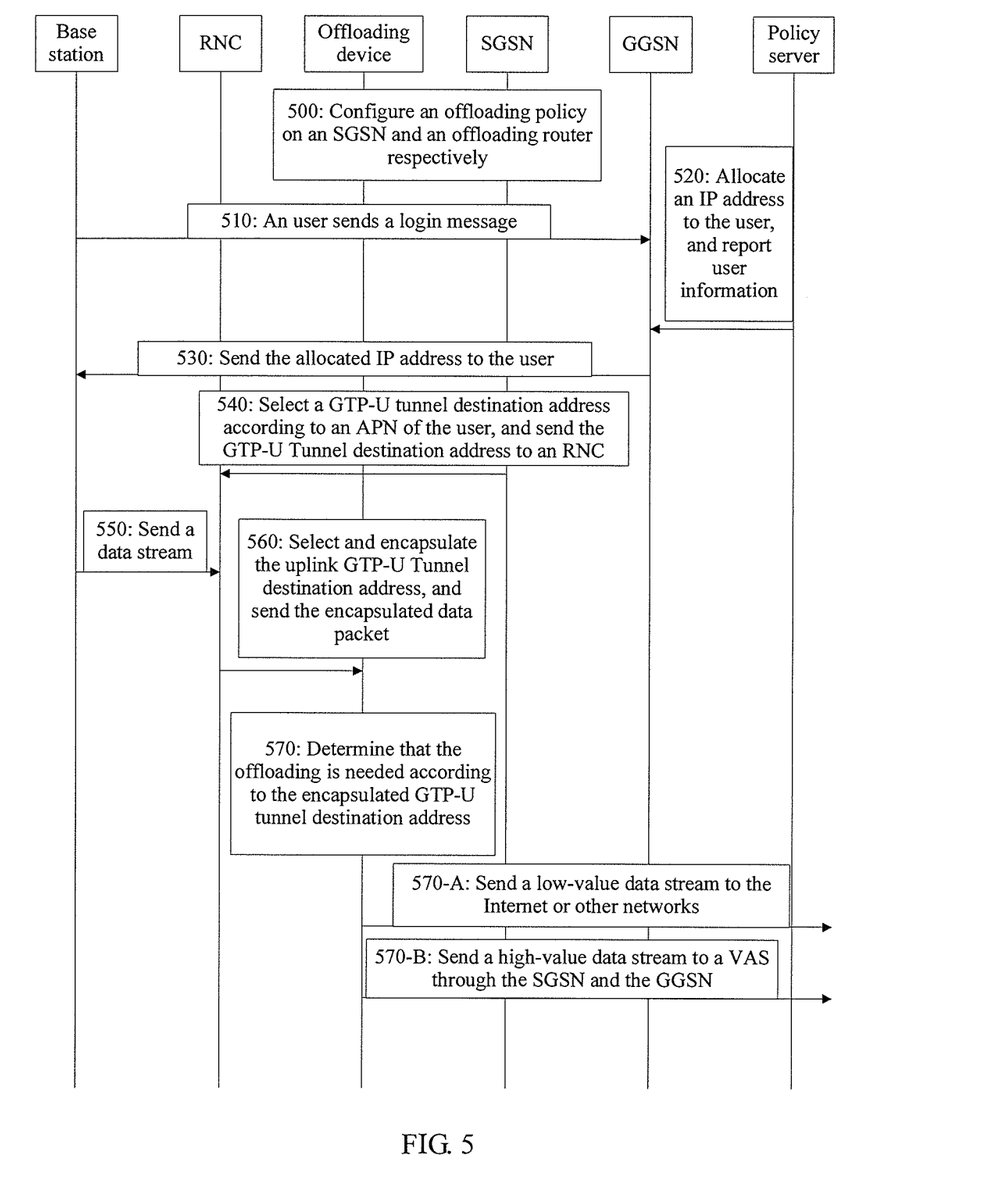
FIG. 5 is a signaling flow chart of another method for offloading network traffic in an embodiment of the present invention.

In another embodiment of the present invention, it is unnecessary to offload data streams of all users, and only data streams of users in a specific range are offloaded according to set policies. The users in the specific range are assigned to specific APNs. Such APNs correspond to specific IP addresses or IP address segment, namely, uplink GPRS tunneling protocol for the user plane (GPRS Tunneling Protocol for the user plane, GTP-U) destination addresses (uplink GTP-U tunnel destination addresses), on the SGSN. Meanwhile, the corresponding IP address segment needs to be configured on the offloading device, so that the offloading device only needs to offload the data streams having data packets corresponding to the uplink GTP-U tunnel destination addresses. FIG. 5 is a signaling flow chart of a method for offloading network traffic in another embodiment of the present invention. The method includes the following steps.

Step 500: Configure a first offloading policy on an SGSN and an offloading device respectively.

In the embodiment of the present invention, an offloading device decides whether to offload according to an uplink GTP-U tunnel destination address of a data packet in a data stream. Correspondingly, an off loading policy needs to be pre-configured. A configuration method includes: setting the same APN for all users requiring offloading to a network; allocating one or multiple uplink GTP-U tunnel destination addresses to the APN on an SGSN (when multiple uplink GTP-U tunnel destination addresses are allocated, the multiple uplink GTP-U tunnel destination addresses may form an IP address segment); and forming an offloading table according to a mapping relation between the APN and the allocated the specific uplink GTP-U tunnel destination address. Another offloading table having the same content as that on the SGSN is also configured on the offloading device.

After configuration of the offloading policy is completed, the offloading device may offload a received data stream.

The contents of steps 510-530 in this embodiment are the same as those of steps 410-430 in the foregoing embodiment, and are not repeatedly described herein.

Step 540: The SGSN selects an uplink GTP-U tunnel destination address according to an APN of a user, and sends the uplink GTP-U tunnel destination address to a radio network controller RNC.

As a core network device, the SGSN can obtain an APN of a user and information about whether the user logs on from a signaling message exchanged between the user and a GGSN. After determining that the user logs on, according to the APN of the user, the SGSN selects an uplink GTP-U tunnel destination address corresponding to the APN from the offloading table configured in step 500 for the user, and sends the uplink GTP-U tunnel destination address together with user information of the user (such as IP address or other information that may uniquely identify the user) to a radio network controller RNC. After receiving the information sent by the SGSN, the radio network controller RNC stores the information.

Step 550: The user sends a data stream to the radio network controller RNC through a base station.

Step 560: The RNC determines the user to which the received datastream belongs, encapsulates the corresponding uplink GTP-U tunnel destination address in a packet of the data stream according to the APN in the user information, and sends the encapsulated packet to the offloading device.

Step 570: After receiving the data stream, the offloading device obtains the uplink GTP-U tunnel destination address of the data packet in the data stream, determines an off loading policy of the user according to the obtained GTP-U tunnel destination address and the stored offloading table, and offloads the data stream of the user.

Offloading may be specifically as follows.

Step 570-A: Send a data stream that encapsulates a specific uplink GTP-U tunnel destination address to the Internet or a specific network such as IP/MPLS network; or Step 570-B: Send a data stream that encapsulates no specific uplink GTP-U tunnel destination address to a VAS or other service processing servers of specific functions through the SGSN and the GGSN.

The specific GTP-U tunnel destination address refers to an uplink GTP-U tunnel destination address corresponding to an offloading table of an offloading router and the APN of the user that requires offloading.

In another embodiment of the present invention, after the offloading device determines, according to the outer uplink GTP-U tunnel destination address of the data packet, to offload the data stream, a step of obtaining, by the offloading device, a second offloading policy may be further included. Specifically, the following method may be used.

A) The offloading device resolves the data packet in the received data stream to obtain the IP address of the user. The offloading device sends a policy request message to a policy server, where the policy request message carries the IP address obtained through parsing. The policy request message is used to request a second offloading policy for the user from the policy server. The policy server finds the user information according to the IP address of the user, generates a second offloading policy according to the user information, and sends the generated second offloading policy to the offloading device.

B) The off loading device resolves the data packet in the received data stream to obtain the IP address of the user. The offloading device sends a user information request message to a policy server, where the user information request message carries the IP address obtained through parsing. The policy server searches for the user information according to the request message, and sends the found user information to the offloading device. The offloading device generates a second offloading policy according to the received user information.

In this case, after receiving the data stream, the offloading, by the offloading device, the data stream according to the uplink GTP-U tunnel destination address of the data packet in the data stream may be specifically: determining, by the offloading device, a data stream needed to be offloaded according to the uplink GTP-U tunnel destination address of the data packet in the data stream, and offloads the data stream according to the obtained second offloading policy. The second offloading policy is the same as that in the embodiment shown in FIG. 4. In this case, the possible offloading method may further include:

sending a low-value data stream in the data streams that encapsulate the specific uplink GTP-U tunnel destination addresses to the Internet or a specific network such as IP/MPLS network;

sending a high-value data stream in the data streams that encapsulate the specific uplink GTP-U tunnel destination addresses to the VAS or other service processing servers of specific functions through the SGSN and the GGSN.

In the embodiment of the present invention, a step of charging the user may be further included. The GGSN and the offloading device generate a charging packet respectively for the data stream offloaded to the GGSN, and the data stream offloaded to the Internet or other specific networks, and report the charging packets to an accounting server (such as AAA server). The AAA server performs, according to a charging identifier, combined charging on the charging packets respectively reported by the GGSN and the offloading device together.

The offloading table in the embodiment of the present invention is only an example. Persons of ordinary skill in the art can also provide other different offloading tables according to the embodiments of the present invention. For example, users requiring no offloading are set in the offloading table, or the offloading is performed according to service contents. Such improvements and variations fall within the protection scope of the present invention.

In the foregoing embodiment of the present invention, the offloading policy of the data stream may be determined according to the offloading table formed according to the APN of the user and the corresponding uplink GTP-U tunnel destination address, or the off loading policy of the data stream may be jointly determined according to the offloading table and the second offloading policy generated according to other information of the user, through which the problem of excessively high networking cost caused by that the data streams all pass through the devices such as SGSN, GGSN and VAS, is avoided.

Figure 6:
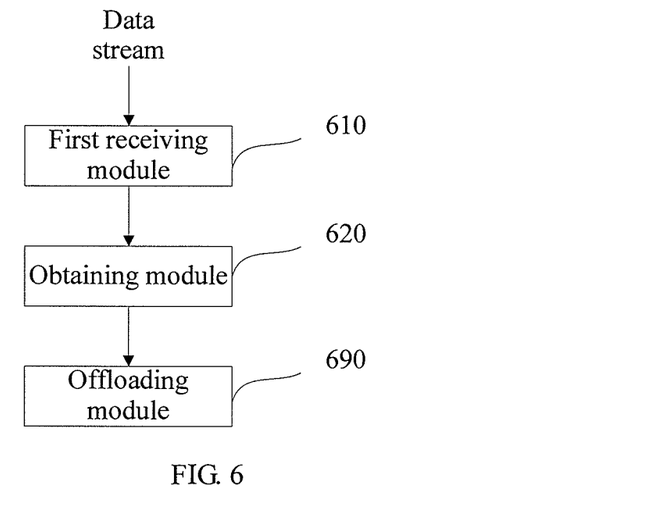
FIG. 6 is a schematic structural diagram of an off loading device in an embodiment of the present invention.
Figure 7:
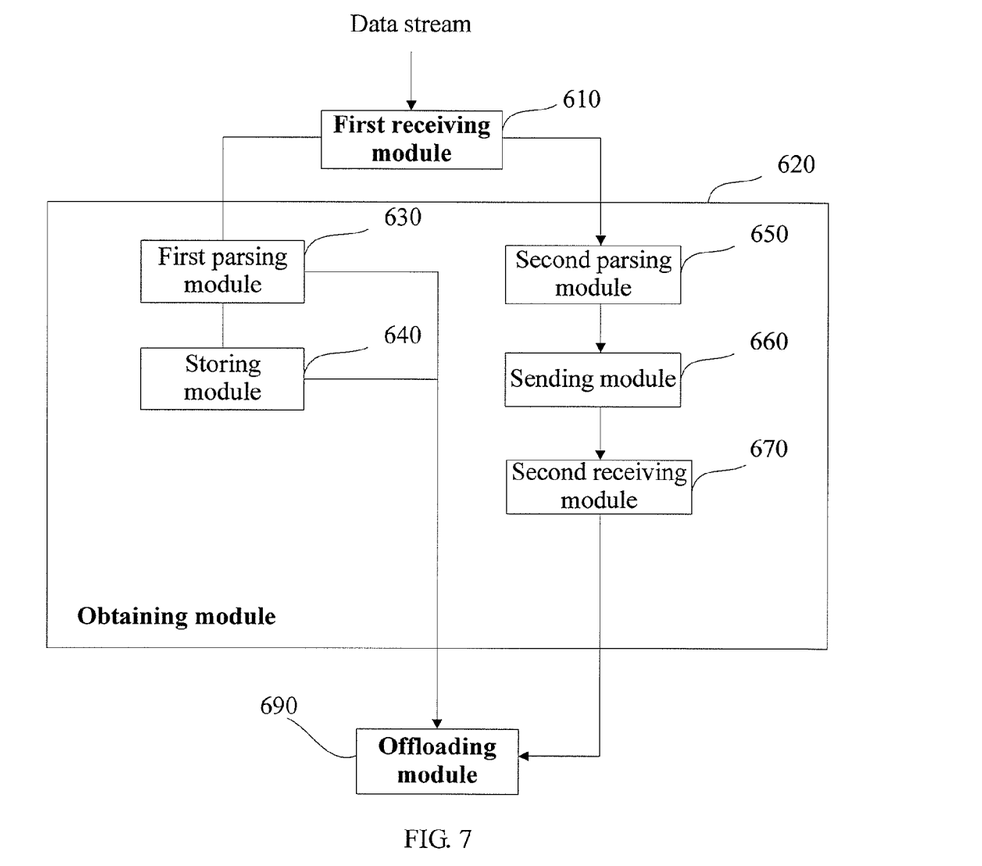
FIG. 7 is a schematic structural diagram of another offloading device in an embodiment of the present invention.
Figure 8:
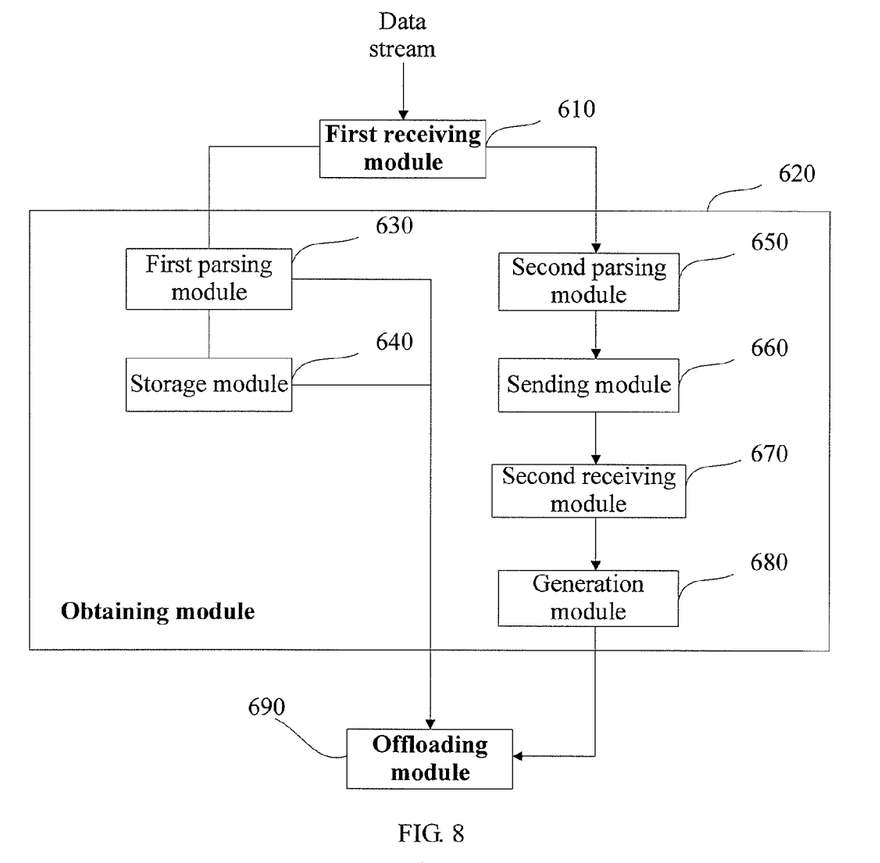
FIG. 8 is a schematic structural diagram of another offloading device in an embodiment of the present invention.

An embodiment of the present invention further provides an offloading device applied in a mobile communication system and configured to implement the methods for offloading network traffic method described in the embodiments of the present invention. FIGS. 6 to 8 are schematic structural diagrams of an offloading device according to embodiments of the present invention. After a first receiving module 610 receives a data stream of a user sent by a base station, an obtaining module 620 obtains an offloading policy of the user. The obtaining the offloading policy of the user may include: obtaining the offloading policy of the user from the offloading device and/or obtaining the offloading policy of the user from a policy server. Specifically, the offloading policy is obtained in the following manners.

When a stored offloading table is obtained from the offloading device as the offloading policy, the offloading device may optionally further include: a first parsing module 630, configured to parse a data packet in the data stream received by the first receiving module 610, and obtain an outer uplink GTP-U tunnel destination address of the data packet; and a storage module 640, configured to store the offloading table, where the offloading table stores a mapping relation between an access point name APN that requires offloading and the uplink GTP-U tunnel destination address.

When the offloading device obtains the offloading policy from the policy server, the of device may optionally include a second parsing module 650. The second parsing module 650 parses a data packet in the data stream received by the first receiving module 610 to obtain an IP address of the user. The offloading device further includes a sending module 660, configured to send a policy request message to the policy server to request an offloading policy for the user, and carry the IP address of the user in the policy request message. Further, the offloading device may further include a second receiving module 670, configured to receive the offloading policy of the user from the policy server.

When the offloading device obtains user information from the policy server and generates an offloading policy according to the user information, the offloading device may optionally include a second parsing module 650. The second resolving module 650 parses a data packet in the received data stream to obtain an IP address of the user. The offloading device further also includes a sending module 660, configured to send a user information request message to the policy server to request user information of the user. The offloading device further includes a receiving module 670, configured to receive the user information sent by the policy server. Moreover, the offloading device may further include a generation module 680, configured to generate an offloading policy of the user according to the user information.

Correspondingly, the obtaining module 620 may further include all or part of modules corresponding to 630-680. For example, the obtaining module 620 may include a first parsing module 630 and a storage module 640, and a second parsing module 650, a sending module 660, and a receiving module 670. An offloading module 690 makes a first offloading decision according to information obtained through parsing by the first parsing module 630 and the offloading table in the storage module 640, and makes a second offloading decision according to the policy received by the receiving module 670. Alternatively, the offloading module 690 makes the first offloading decision according to the information obtained through parsing by the first resolving module 630 and the offloading table in the storage module 640, and makes a second offloading decision according to the policy generated by the generation module 680. Finally, much fine network traffic offloading is implemented.

After obtaining the offloading policy of the user, the offloading module 690 of the offloading device forwards the data stream received by the receiving module 610 according to the off loading policy. The forwarding direction of the data stream varies according to different offloading policies.

When the offloading needs to be performed according to the outer uplink GTP-U tunnel destination address of the data packet in the data stream, according to the outer uplink GTP-U tunnel destination address of the data packet obtained by the first parsing module 630 and the offloading table in the storage module 640, the offloading module 690 may send a data stream whose data packet carries the outer uplink GTP-U tunnel destination address to the Internet or other specific networks, and send a data stream whose data packet carries no outer uplink GTP-U tunnel destination address to a VAS or other service processing servers. The present invention may also be implemented by using a contrary processing manner.

When the offloading needs to be performed according to the value of the data stream, the offloading module 690 may send, according to the offloading policy received by the receiving module 670 from the policy server or the offloading policy generated by the generation module 680, a low-value data stream to the Internet or other specific networks and send a high-value data stream to the VAS or other service processing servers.

When the offloading needs to be performed according to the real-time performance or priority of a service, the offloading module 690 may send, according to the offloading policy received by the receiving module 670 from the policy server or the offloading policy generated by the generation module 680, a data stream of low real-time performance requirement or low priority to the Internet or other specific networks and send a data stream of high real-time performance requirement or high priority to the VAS or other service processing servers.

In the embodiment of the present invention, the first parsing module 630 and the second parsing module 650 may be configured separately or integratively. In the embodiment of the present invention, the first receiving module 610 and the second receiving module 670 may be configured separately or integratively.

The offloading device in the embodiments of the present invention may further include a charging module (not shown in the figures), configured to generate a charging packet for the data stream offloaded to the Internet or other specific networks, and send the charging packet to an accounting server for charging, where the charging packet carries a charging identifier of the user.

The offloading device in the embodiments of the present invention can implement the embodiments of the method of the present invention. Therefore, for detailed functions of the offloading device in the embodiments of the present invention, reference may be made to the embodiments of the method of the present invention.

An embodiment of the present invention additionally provides a policy server, which can implement the embodiments of the method of the present invention in combination with other devices.

An embodiment of the present invention additionally provides a serving GPRS support node SGSN, which can implement the method shown in FIG. 5 and other methods derived therefrom.

An embodiment of the present invention additionally provides a radio network controller RNC, which can implement the method shown in FIG. 5 and other methods derived therefrom.

Through the embodiments of the present invention, the offloading device can obtain the corresponding offloading policy according to the data stream sent by a forwarding plane, sends the data stream of low value, low real-time performance requirement or low priority to the Internet or other specific networks, and sends the data streams of high value, high real-time performance requirement or high priority to a high-value device such as SGSN, GGSN, and VAS, thereby reducing the networking cost.

Through the above description of the implementation, it is clear to persons skilled in the art that the present invention may be accomplished through hardware, or through software plus a necessary universal hardware platform. But in many cases, the software implementation is preferred. Based on this, the above technical solutions or the part that makes contributions to the prior art can be substantially embodied in the form of a software product. The computer software product may be stored in a computer readable storage medium such as a floppy disk, a hard disk, or an optical disk, and contain several instructions to instruct computer equipment (for example, a personal computer, a server, or network equipment) to perform the method described in the embodiments of the present invention.

The foregoing descriptions are merely specific embodiments of the present invention, but are not intended to limit the protection scope of the present invention. Changes or replacements readily apparent to persons skilled in the prior art within the technical scope of the present invention should fall within the protection scope of the present invention. Therefore, the protection scope of the present invention is subject to the appended claims.

What is claimed is:

1. A method for offloading network traffic applied in mobile communication, the method comprising:
  receiving, by an offloading device located before a serving general packet radio service support node (SGSN) in an uplink direction of a user, a data stream of the user sent by a base station, obtaining an offloading policy of the user from the offloading device or obtaining the offloading policy of the user from a policy server, and forwarding the data stream according to the offloading policy;
  wherein obtaining the offloading policy of the user from the offloading device comprises parsing a data packet in the data stream, obtaining an uplink GPRS Tunneling Protocol for the user plane (GTP-U) tunnel destination address of the data packet, and determining the offloading policy of the user according to the obtained uplink GTP-U tunnel destination address and a stored offloading table;
  wherein forwarding the data stream according to the offloading policy comprises:
  determining whether to forward the data stream to the SGSN or to forward the data stream to internet or other specific network according to the offloading policy;
  further comprising configuring the offloading policy comprising:
  setting the same access point name (APN), by the SGSN, for all users requiring offloading;
  allocating one or multiple uplink GTP-U tunnel destination addresses to the APN on the SGSN, and generating the offloading table according to a mapping relation between the APN and the uplink GTP-U tunnel destination address; and
  configuring, on the offloading device, an offloading table having the same content as that of the offloading table on the SGSN as the offloading policy.

2. The method according to claim 1, wherein after obtaining the offloading policy of the user from the offloading device, the method further comprises obtaining a second offloading policy from the offloading device or the policy server.

3. The method according to claim 1, wherein before receiving the data stream of the user sent by the base station, the method further comprises:
  after determining that the user logs on, selecting, by the SGSN, an uplink GTP-U tunnel destination address from the one or multiple uplink GTP-U tunnel destination addresses for the APN of the user, and sending the selected uplink GTP-U tunnel destination address together with user information of the user to a radio network controller; and
  after receiving the data stream sent by the user, encapsulating, by the radio network controller, the uplink GTP-U tunnel destination address selected by the SGSN for the data packet of the data stream, and sending the encapsulated data packet to the offloading device.

4. The method according to claim 1, wherein obtaining the offloading policy of the user from the policy server comprises:
  parsing a data packet in the data stream to obtain an IP address of the user;
  sending a policy request message to the policy server, wherein the policy request message carries the IP address of the user; and
  receiving the offloading policy generated by the policy server according to user information found according to the IP address of the user.

5. The method according to claim 1, wherein obtaining the offloading policy of the user from the offloading device comprises:
  parsing a data packet in the data stream to obtain an IP address of the user;
  sending a user information request message to the policy server, wherein the user information request message carries the IP address of the user;
  receiving user information found by the policy server according to the IP address of the user; and
  generating the offloading policy according to the received user information.

* * * * *